Dec. 6, 1960     H. H. MILLER     2,963,305
HOSE CLAMP
Filed Dec. 9, 1958
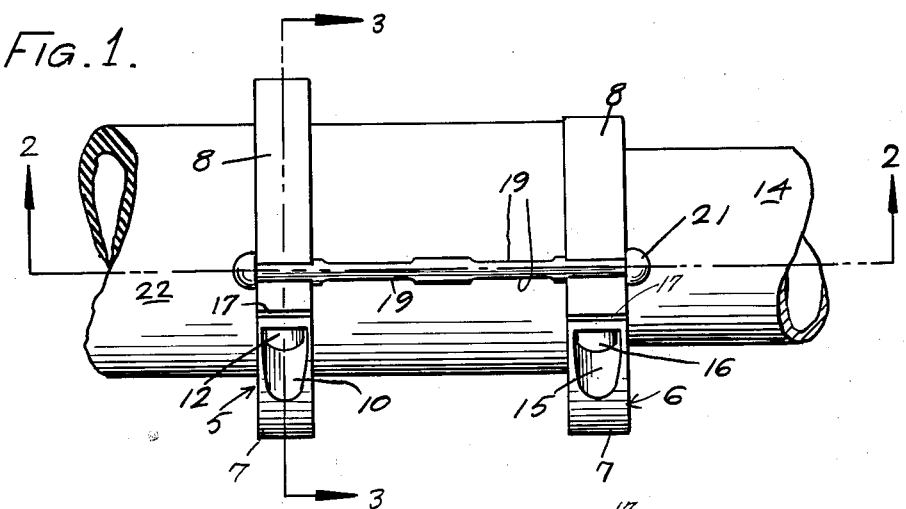
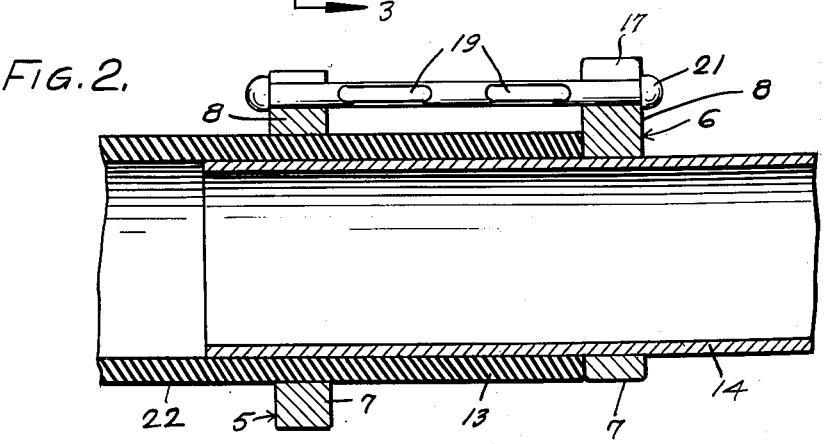
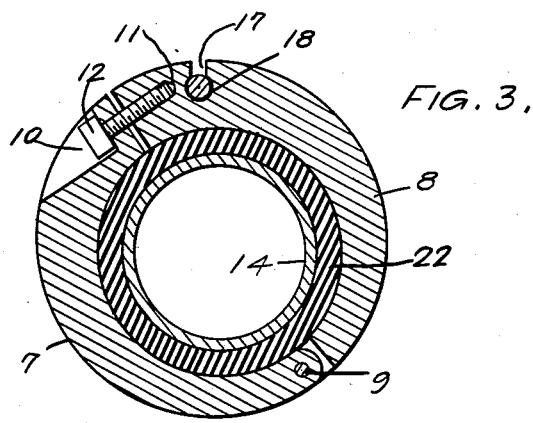
INVENTOR
H. H. MILLER
BY
ATTORNEY United States Patent Office 2,963,305
Patented Dec. 6, 1960

2,963,305

HOSE CLAMP

Harry H. Miller, 1815 W. Market St., York, Pa.

Filed Dec. 9, 1958, Ser. No. 779,194

1 Claim. (Cl. 285—114)

This invention relates to clamps designed for clamping rubber hose to metal filling pipes of storage tanks, wherein the liquid is being transferred under pressure, the primary object of the invention being to provide a hose clamp which will securely hold the filling hose against accidental displacement under pressure.

An important object of the invention is to provide a hose clamp which will be securely held in place without the necessity of securing the rings of the clamp with excessive clamping force which usually cuts the rubber filling hose and damages the hose to such a degree that the hose will become disconnected with a loss of the liquid being transferred.

A further object of the invention is to provide a pair of clamping rings, one of the rings clamping the hose, while the other ring clamps the metal filling pipe of the tank being filled, there being provided connecting rods between the clamping rings for holding the clamping rings against separation under pressure.

With the foregoing and other objects in view which will appear as the description proceeds, the invention consists of certain novel details of construction and combinations of parts, hereinafter more fully described and pointed out in the claims, it being understood that changes may be made in the construction and arrangements of parts without departing from the spirit of the invention as claimed.

Referring to the drawing:

Figure 1 is a plan view of a hose clamp constructed in accordance with the invention.

Fig. 2 is a sectional view taken on line 2—2 of Fig. 1.

Fig. 3 is a sectional view taken on line 3—3 of Fig. 1.

Referring to the drawing in detail, the hose clamp embodies a pair of split clamping rings 5 and 6, the clamping ring 5 being of a diameter larger than the diameter of ring 6, and as shown, comprises semicircular sections 7 and 8 connected by a pivot pin 9. Ring section 8 is provided with a tangentially disposed cutout portion 10 adjacent to the opening 11, through which screw 12 extends, said screw being threaded in an opening formed in the section 8, drawing the sections 7 and 8 into clamping engagement with the hose on which the clamp is positioned. Thus, it will be seen that the clamping force of the ring 5 may be regulated to insure against leakage at the point of connection between the rubber filling hose 13 and metal filling pipe 14 of the tank being filled.

The ring 6 is also provided with a cutout portion 15 providing a clearance from the screw 16 which is threaded in an opening formed in the adjacent end of the split ring 6, whereby the ring 6 may be securely clamped around the metal filling pipe 14, providing an anchor ring for the hose clamp.

The rings 5 and 6 are provided with notches 17 that extend inwardly from the peripheries thereof terminating in slightly enlarged circular portions 18, which notches 17 are of widths to receive the contracted portion 19 of the connecting rod 20 which contracted portions permit the rod 20 to be positioned within the notches and the rings 5 and 6 slid longitudinally until the heads 21 at the ends of the rod engage the outer surfaces of the rings 5 and 6, respectively, preventing movement of the rings 5 and 6 away from each other, caused by the excessive pressure used in the transfer of liquid under pressure, to a receiving tank.

As shown by Fig. 2 of the drawing, the rod 20 is connected to the rings 5 and 6, and the ring 6 of the hose clamp is fitted on the pipe 14. The end of the hose 13 is now positioned over the end of pipe 14 with its end contacting the ring 6. The ring 5 is now clamped around the hose 13 and secured in such clamped position by operating the screw 12 to tighten the sections of the ring around the hose.

From the foregoing it will be seen that I have provided a hose clamp for clamping a hose to a filling pipe of a tank, in such a way that the hose will be held against accidental displacement when transferring liquid under pressure to a receiving or storage tank.

Having thus described the invention, what is claimed is:

A clamp for clamping a hose on a filling pipe through which fluid under pressure is delivered to said pipe, comprising split ring members having slots extending inwardly from the peripheries thereof, the slots terminating in enlarged circular ends, the inner surfaces of said ring members being eccentric with respect to the outer surfaces thereof, means for securing one of said ring members to said filling pipe abutting the end of said hose fitted thereon, the other ring member being secured around the hose fitted on said pipe clamping said hose on said pipe with said slots of said ring members in alignment, a connecting rod having heads at its ends, of diameters greater than the diameters of the enlarged circular ends of said slots, said rod having contracted portions spaced from the ends thereof adapted to move into said slots, the ends of said rods beyond said contracted portions moving into said enlarged circular end portions of said slots with said heads engageable with said ring members, securing said ring members to said filling pipe against accidental displacement longitudinally of the filling pipe.

References Cited in the file of this patent

UNITED STATES PATENTS

| | | |
|---|---|---|
| 393,400 | Sharpneck | Nov. 27, 1888 |
| 1,097,436 | Hoff | May 19, 1914 |
| 1,384,962 | Kuhne | July 19, 1921 |
| 1,539,001 | Steeple | May 26, 1925 |
| 1,898,297 | Fox | Feb. 21, 1933 |
| 2,700,199 | Buckley | Jan. 25, 1955 |
| 2,735,146 | Purviance | Feb. 21, 1956 |